United States Patent
Teranishi et al.

(10) Patent No.: US 6,184,289 B1
(45) Date of Patent: Feb. 6, 2001

(54) STYRENE RESIN COMPOSITION AND MOLDING THEREOF

(75) Inventors: Tadashi Teranishi; Haruo Ichikawa, both of Hyogo (JP)

(73) Assignee: Daicel Chemical Industries, Ltd., Osaka (JP)

( * ) Notice: Under 35 U.S.C. 154(b), the term of this patent shall be extended for 0 days.

(21) Appl. No.: 08/952,148

(22) PCT Filed: Mar. 26, 1997

(86) PCT No.: PCT/JP97/01020

§ 371 Date: Nov. 3, 1997

§ 102(e) Date: Nov. 3, 1997

(87) PCT Pub. No.: WO97/35921

PCT Pub. Date: Oct. 2, 1997

(30) Foreign Application Priority Data

Mar. 26, 1996 (JP) .................................................... 8-069733

(51) Int. Cl.⁷ ............................ C08L 53/02; C08L 37/00; C08L 5/04

(52) U.S. Cl. ................................ 525/95; 525/65; 525/74; 525/98; 524/505

(58) Field of Search .................................. 525/73, 74, 98, 525/99, 95

(56) References Cited

U.S. PATENT DOCUMENTS 5,470,914 * 11/1995 Coolbaugh et al. .................... 525/66

* cited by examiner

*Primary Examiner*—Tae Yoon
(74) *Attorney, Agent, or Firm*—Flynn, Thiel, Boutell & Tanis, P.C.

(57) ABSTRACT

A rubber-modified styrene resin composition which can provide a molding having a good balance between surface gloss and impact resistance and a styrene resin composition and a molding thereof having good toughness and excellent adhesion, transparency, and moldability is formed from a styrene resin composition comprising (A) an epoxidized block copolymer of a styrene monomer with a conjugated diene compound, (B) a non-modified synthetic rubber and (C) a styrene polymer and a molded article thereof.

37 Claims, No Drawings

STYRENE RESIN COMPOSITION AND MOLDING THEREOF

BACKGROUND OF THE INVENTION

The present invention relates to a rubber-modified styrene resin composition having an excellent appearance and impact resistance. More particularly, the present invention relates to a rubber-modified styrene resin composition which can provide a molding having a good balance between surface gloss and impact resistance.

The present invention relates to a styrene resin composition and a molding thereof having good toughness and excellent adhesion, transparency, and moldability.

PRIOR ART

Impact-resistant styrene resins are prepared by polymerizing a styrene monomer in the presence of a rubber polymer. By virtue of their excellent strength, moldability and other properties, they are extensively used as molding materials for the housing of domestic electric appliances, such as televisions, office automation equipment, packaging materials, miscellaneous goods (or sundries) and the like.

In recent years, expansion of the field of demand for the above products and, at the same time, an increasing demand for cost reduction and a trend toward a reduction in thickness have lead to a demand for improved properties, particularly, an improvement in balance between impact resistance and surface gloss.

In general, the impact resistance of the resin prepared by the above polymerization method can be improved by either increasing the amount of the rubber polymer or increasing the average particle size of the dispersed particles. Both the above methods, however, cause deteriorated surface gloss. On the other hand, the surface gloss can be improved by either reducing the amount of the rubber polymer or reducing the average particle size of the dispersed particles. Both of the above methods, however, cause remarkably lowered impact resistance.

Thus, the impact resistance and the surface gloss are mutually conflicting properties, making it difficult to obtain an impact-resistant styrene resin possessing a high impact resistance and, at the same time, an excellent surface gloss.

In order to improve the properties of these impact-resistant styrene resins, JP-B 61-50488 and JP-A 59-20334 and JP-A 60-203618 propose a method for limiting the properties of the rubber polymer used, such as the solution viscosity, microstructure, and branch structure. Further, JP-A 62-178458 and JP-A 4-100810 and the like propose the use of a rubber polymer comprising a high-molecular weight polybutadiene rubber and a low-molecular weight polybutadiene rubber. As a result of careful review of these studies, it was found that, although an improvement over the conventional methods is certainly recognized, the balance between surface gloss and impact resistance is not yet satisfactory from the practical viewpoint.

On the other hand, JP-B 42-17492, JP-B 48-18594, and JP-B 1-33485, JP-A 63-78317 and JP-A 63-165413 propose a method wherein a styrene/butadiene block copolymer rubber having a high affinity for an aromatic vinyl resin is singly used as the rubber polymer, and JP-A 4-88006 proposes the use of a blend of a styrene/butadiene block copolymer rubber having a higher molecular weight with a styrene/butadiene block copolymer rubber having a lower molecular weight as the rubber polymer. According to these methods, the resultant resin has, in many cases, a lowered impact resistance although it has an improved gloss.

JP-A 62-280211 and JP-A 4-209614 propose the use of a blend of a styrene/butadiene copolymer with a polybutadiene rubber as the rubber polymer. However, the proportion of polybutadiene rubber is so low that the impact resistance is not satisfactory.

JP-A 2-178312 and JP-A 3-28210 and the like propose the provision of a particle disperser, such as a line mixer, in a production line to prepare a styrene resin possessing excellent gloss and, at the same time, high impact resistance. This proposal, however, has a critical drawback in that a great deal of investment is required due to the necessity of a change in specifications of a plant or the like.

JP-B 5-25897 and JP-B 4-63099 propose an impact-resistant polystyrene resin composition comprising a blend of a rubber-modified polystyrene with a styrene/butadiene block copolymer. The rubber-modified polystyrene has a problem in that the rubber-modified polystyrene should be prepared by separately preparing a rubber-modified polystyrene containing a smaller-size particle rubber polymer fraction and a rubber-modified polystyrene containing a larger-size particle rubber polymer fraction and blending by means of an extruder, or by blending a rubber-modified polystyrene containing a smaller-size particle rubber polymer with a rubber-modified polystyrene containing a larger-size particle rubber polymer in a polymerizer.

A modified polystyrene containing a rubber component, such as a styrene-butadiene block copolymer, is widely used for injection molding, such as a housing of electrical apparatus, a stationery product and a toy. Unstretched or unoriented, uniaxially stretched or oriented, or biaxially stretched or oriented styrene resin films, sheets, or tubes composed mainly of a modified polystyrene containing a rubber component, such as a styrene-butadiene block copolymer, have good transparency and impact resistance and, hence, have hitherto been widely used as materials for food packaging vessels and heat shrinkable films. The modified polystyrene resin itself, however, has poor adhesion to other materials, for example, polyamides, polyesters, iron, stainless steel, and aluminum, making it necessary to use an adhesive to improve the adhesion. Further, in the case of a composition having a high rubber content, although the impact resistance can be improved, problems associated with the transparency and the toughness of the film during molding are often increased. Lowering the rubber content can improve the transparency. In this case, however, the composition is fragile and, hence, has a deteriorated moldability into a vessel.

In order to meet the demand in the market for a balance between impact resistance and surface gloss in the styrene resin mentioned above, it is necessary to provide a resin composition which is easily produced while still maintaining excellent properties. Accordingly, an object of the present invention is to provide a rubber-modified styrene resin composition having a good balance between impact resistance and surface gloss.

An object of the present invention is to provide a production process which can produce on an industrial scale a molding of a styrene resin composition having improved adhesion, transparency, and moldability while maintaining the excellent rigidity and transparency inherent in the styrene resin, and a vessel using the film, sheet, or tube.

SUMMARY OF THE INVENTION

The present inventors have made extensive and intensive studies with a view to developing the above rubber-modified styrene resin composition and, as a result, has found that the use of a rubber polymer comprising a blend of an epoxidized block copolymer of styrene with a conjugated diene (hereinafter referred to an "epoxy-modified block copolymer") and a polybutadiene rubber in a particular proportion results in the formation of a rubber-modified styrene resin composition having a high impact resistance and high surface gloss.

The present invention have solved the above problems and provides an injection molding and an extrusion molding possessing improved adhesion, transparency, and moldability by using a styrene resin composition comprising:
(A) an epoxidized block copolymer of a styrene monomer with a conjugated diene compound,
(B) a non-modified synthetic rubber and
(C) a styrene polymer.

The invention provides a styrene resin composition comprising (A) an epoxidized block copolymer of a styrene monomer with a conjugated diene compound, (B) a non-modified synthetic rubber and (C) a styrene polymer and a molded article thereof.

A first preferable embodiment of the invention is a composition comprises a matrix of (C) and a particulate rubber polymer dispersed in the matrix, said rubber polymer comprising (A) and (B).

The invention provides an article molded from the composition of the first embodiment.

It is preferable in the first embodiment that (B) is an alkadiene polymer; (B) is polybutadiene or a copolymer rubber of a styrene monomer and butadiene; (A) is an epoxidized block copolymer of styrene with a conjugated diene and (B) is polybutadiene; (B) is a sole non-modified synthetic rubber; the weight ratio of (A) (B) is in the range of (50:50) to (1:99); (A) is an epoxidized block copolymer of 20 to 60 percent by weight of styrene with 80 to 40 percent by weight of a conjugated diene; (A) is an epoxidized block copolymer of 24 to 60 percent by weight of styrene with 76 to 40 percent by weight of a conjugated diene; (A) has an epoxy equivalent of 140 to 7000; (A) has an epoxy equivalent of 140 to 2700; the particulate rubber polymer has (i) a smaller-size particle fraction having an average particle size of 0.1 to 0.6 μm and (ii) a larger-size particle fraction having an average particle size of 0.7 to 4.0 μm; the weight ratio of (i) the smaller-size particle fraction to (ii) the larger-size particle fraction is in the range of 75:25 to 5:95; or the weight ratio of (i) the smaller-size particle fraction to (ii) the larger-size particle fraction is in the range of 45:55 to 5:95.

A second preferable embodiment of the invention is a composition in which (A), (B) and (C) are blended with each other. It is preferable in the second embodiment that (B) is an alkadiene polymer; (B) is polybutadiene or a copolymer rubber of styrene and butadiene; (B) is a sole non-modified synthetic rubber; the composition comprises 0.01 to 50% by weight of (A), 12.5 to 99.9% by weight of (B) and 0 to 75% by weight of (C), the sum total of (A) and (B) ranging from 15 to 100 percent by weight; the composition comprises 1 to 20% by weight of (A), 30 to 60% by weight of (B) and 0 td 75% by weight of (C), the sum total of (A) and (B) ranging from 15 to 100 percent by weight; or (B) is a copolymer rubber of 30 to 90 percent by weight of a styrene monomer and 70 to 10 percent by weight of a conjugated diene monomer; (A) has an epoxy equivalent of 140 to 7000.

The invention provides an article molded from the composition of the second embodiment. It may be obtainable by injection or extrusion.

In both first and second embodiments, the styrene monomer for A, B, and c includes styrene, alkyl-substituted styrenes (for example, o-methylstyrene, p-methylstyrene, m-methylstyrene, 2,4-dimethylstyrene, p-ethylstyrene, and p-t-butylstyrene), α-alkyl-substituted styrenes (for example, α-methylstyrene and α-methyl-p-methylstyrene), halogenated styrenes (for example, o-chlorostyrene and p-chlorostyrene). These styrene monomers may be used alone or as a mixture of two or more.

DETAILED DESCRIPTION OF THE INVENTION

The present invention will be described in more detail.

The rubber polymer used in the present invention can be a blend of 50 to 1% by weight of an epoxy-modified block copolymer (A) with 50 to 99% by weight of a polybutadiene rubber (B), preferably a blend of 40 to 20% by weight of an epoxy-modified block copolymer (A) with 60 to 80% by weight of a polybutadiene rubber (B). When the proportion of the epoxy-modified block copolymer is larger than 50% by weight, the impact resistance is lowered, while when it is less than 1% by weight, the gloss is lowered.

The epoxy-modified block copolymer (A) of the present invention is an epoxidized block copolymer of 20 to 60% by weight of a styrene monomer with 80 to 40% by weight of a conjugated diene, preferably an epoxidized block copolymer of 24 to 60% by weight of a styrene monomer with 76 to 40% by weight of a conjugated diene, still preferably an epoxidized block copolymer of 30 to 45% by weight of a styrene monomer with 70 to 55% by weight of a conjugated diene. When the proportion of the styrene monomer in the epoxy-modified block copolymer is less than 20% by weight, the gloss is lowered, while when it exceeds 60% by weight, the impact resistance is lowered.

Representative examples of the conjugated diene compound which can constitute the epoxy-modified block copolymer include 1,3-butadiene, isoprene, 1,3-pentadiene, 2,3-dimethyl-1,3-butadiene, piperylene, 3-butyl-1,3-octadiene, and phenyl-1,3-butadiene. Among them, 1,3-butadiene and isoprene are preferred because they are inexpensive and easily available. These conjugated dienes may be used alone or in combinations of two or more.

The structure of the block copolymer of styrene with the conjugated diene is not particularly limited. For example, the block copolymer of styrene with the conjugated diene may be one represented by A-B-A, B-A-B, A-B-A-B-A or the like. The molecule per se may have any of straight chain, branched chain and radial structures or any combination thereof. Styrene in the block copolymer may be homogeneously distributed or alternatively may be taperingly distributed. The unit number of blocks increases or decreases gradually. Further, a plurality of portions with styrene being homogeneously distributed and/or a plurality of portions with styrene being taperingly distributed co-exist respectively in the copolymer portion.

The epoxidation of the block copolymer of styrene with the conjugated diene may be carried out by reacting the block copolymer with a known epoxidizing agent.

Examples of epoxidizing agents usable in the epoxidation reaction include organic peracids, such as peracetic acid, perbenzoic acid, performic acid, and trifluoroperacetic acid, hydrogen peroxide, and a combination of hydrogen peroxide with a low-molecular fatty acid. Among them, a preferred epoxidizing agent is peracetic acid which is inexpensively available by virtue of mass production on an industrial scale and, at the same time, has relatively high stability. Particularly preferred is a solution of peracetic acid in a solvent such as ethyl acetate. Further, a peracetic acid/acetic acid/ethyl acetate solution system is also particularly preferred.

The amount of the epoxidizing agent is not particularly limited and may be suitably selected depending upon the reactivity of the epoxidizing agent, the desired degree of epoxidation, and the amount of unsaturated carbon bonds in the block copolymer used. However, the amount of the epoxidizing agent is preferably such that the epoxy equivalent of the finally prepared epoxy-modified block copolymer is 140 to 7,000, preferably 140 to 2700.

The epoxy equivalent is more preferably 200 to 2000. It is calculated by the equation: epoxy equivalent=1600/ (concentration of oxirane oxygen of epoxy-modified block copolymer (wt %)), and represents the weight of the epoxy-modified block copolymer per 1 mol of oxirane oxygen.

The concentration of oxirane oxygen is determined by titration with a solution of hydrogen bromide in acetic acid. When the epoxy equivalent is large, the concentration of oxirane oxygen is lowered. On the other hand, when the epoxy equivalent is small, the concentration of oxirane oxygen is high. If the epoxy equivalent is smaller than 140, the polymer is less likely to have elastic properties, while if it exceeds 7000, specific properties derived from the epoxidation is less likely to appear.

Examples of the non-modified synthetic rubber as the component (B) include alkadiene polymer, for example, polybutadiene, polyisoprene, polypiperylene, polychloroprene, among them, polybutadiene is particularly preferred. Further, examples include styrene-butadiene copolymer rubber, styrene-isoprene copolymer rubber, styrene-isoprene-butadiene copolymer rubber, and ethylene-propylene copolymer rubber, among them styrene-butadiene copolymer rubber is particularly preferred. They may be used alone or in combination of two or more. Use of a single one is preferrable to maintain a high impact strength and excellent surface gloss.

Although the viscosity of the polybutadiene rubber at 25° C. as a 5% styrene solution is not particularly limited, it is preferably 30 to 220 cps, more preferably 30 to 170 cps. When the viscosity of the polybutadiene rubber at 25° C. as a 5% styrene solution is less than 30 cps, the handleability of the rubber polymer is poor, while when it exceeds 220 cps, the gloss is lowered.

The rubber polymer content of the rubber-modified styrene resin composition according to the present invention is not limited. It, however, is preferably in the range of 3 to 15% by weight. When the rubber polymer content is less than 3% by weight, the impact resistance is lowered, while when it exceeds 15% by weight, the gloss is lowered.

The epoxidized block copolymer of a styrene monomer with a conjugated diene compound (A) may be prepared by epoxydizing a block copolymer comprising a polymer block comprising a styrene monomer and a polymer block comprising a conjugated diene. Examples of styrene monomers include styrene, α-methylstyrene, vinyltoluene. Examples of conjugated dienes include butadiene, isoprene, chloroprene, and cyclopentadiene. Examples of the commercially available block co polymer include a styrene-butadiene block copolymer, a styrene-isoprene block copolymer and a partially hydrogenated styrene-butadiene block copolymer.

The component (A) of the present invention obtained by reacting the block copolymer with an epoxidizing agent, such as hydrogen peroxide or a peracid, in an inert solvent. Peracids usable herein include peracetic acid, performic acid, perbenzoic acid, and trifluoroperacetic acid. Among them, peracetic acid is a preferred epoxidizing agent because it is mass-produced on an industrial scale, and inexpensive has high stability. The degree of epoxidation of the epoxidized block copolymer in the present invention may be determined by titration with hydrobromic acid followed by calculating according to the following equation.

Epoxy equivalent (g/eq)=(16,000×[weight of epoxidized block copolymer (g)])/([titer of hydrobromic acid (ml)]×[factor of hydrobromic acid])

The epoxy equivalent of the epoxidized block copolymer in the present invention is preferably 140 to 7,000 g/eq, particularly preferably 250 to 2,000 g/eq. When the epoxy equivalent is less than 140 g/eq, the elasticity inherent in the diene block copolymer is insufficient. On the other hand, when it exceeds 7,000 g/eq, the effect of modification with an epoxy group is reduced.

The structure of the block copolymer of styrene monomer with the conjugated diene as a starting material of the epoxidized compound (A) of the present invention is not particularly limited. For example, the block copolymer of a styrene monomer with the conjugated diene may be one represented by A-B-A, B-A-B, B-A-B-A, A-B-A-B-A, (A-B)$_4$Si or the like. The molecule per se may have any of straight chain, radial structures and branched chain or any combination thereof. The styrene monomer in the block copolymer may be homogeneously distributed or alternatively may be taperingly distributed.

The non-modified synthetic rubber (B) of the present invention added to the styrene resin to improve the impact resistance, when the rubber has the desired elastic properties, is not particularly limited. Among the non-modified synthetic rubbers of the present invention include a thermoplastic elastmer. Examples of the non-modified synthetic rubber include polybutadiene (BR), polyisoprene (IR), styrene-butadiene copolymer rubber (SBR), styrene-butadiene block copolymer rubber (SBS), styrene-isoprene blck copolymer rubber (SIS), hydrogenated styrene-butadiene block copolymer (SEBS), polychloroprene (CR), acrylonitrile-butadiene copolymer (NBR), butyl rubber (IIR), ethylene-vinyl acetate rubber (EVA), ethylene-propylene copolymer rubber (EPM), ethylene-propylene-diene copolymer rubber (EPDM), acryl rubber (ACM), chlorinated polyethylene (CM), chlorosulfonated polyethylene (CSM), epichlorohydrin rubber (CO). Particularly, from the viewpoint of keeping the transparency, the component (B) having high compatibility with styrene polymer is preferred. Polybutadiene (BR), polyisoprene (IR), styrene-butadiene copolymer rubber (SBR), styrene-butadiene block copolymer rubber (SBS), styrene-isoprene block copolymer rubber (SIS) and hydrogenated styrene-butadiene block copolymer rubber (SEBS) are preferably selected. When SBS, SIS and SEBS are used as the styrene block copolymer, the styrene content is preferably 30 to 90% by weight. The non-modified block copolymer is not necessarily required to be identical to the starting materials of the epoxidized block copolymer. Further, a mixture of two or more diene block copolymers may be used so far as the styrene content of the component (B) is 30 to 90% by weight.

The rubber-modified styrene resin composition of the present invention may be prepared by dissolving the rubber polymer in a styrene monomer and then polymerizing the monomer by any conventional method. Polymerization methods which may be generally used include bulk polymerization, solution polymerization, or bulk-suspension polymerization wherein bulk polymerization is followed by suspension polymerization. Among them, bulk polymerization is preferred.

Styrene monomers usable in the present invention include, for example, styrene, alkyl-substituted styrenes (for example, o-methylstyrene, p-methylstyrene, m-methylstyrene, 2,4-dimethylstyrene, p-ethylstyrene, and p-t-butylstyrene), α-alkyl-substituted styrenes (for example, p-t-butylstyrene), α-alkyl-substituted styrenes (for example, α-methylstyrene and α-methyl-p-methylstyrene), halogenated styrenes (for example, o-chlorostyrene and p-chlorostyrene). Among them, styrene, o-methylstyrene, and p-methylstyrene are preferred styrene monomers, and styrene is particularly preferred. These styrene monomers may be used alone or as a mixture of two or more.

If necessary, copolymerizable monomers, for example, (meth)acrylic acids, such as acrylic acid and methacrylic acid, (meth)acrylic esters, such as methyl methacrylate, ethyl acrylate, and butyl acrylate, maleic anhydride, and acrylonitrile, may be added to the styrene monomer in such an amount as will not be uneconomical.

In the present invention, when no polymerization initiator is used, the polymerization may be conducted at a temperature in the range of 90 to 200° C., while when the polymerization is conducted in the presence of a polymerization initiator, such as an organic peroxide, the polymerization temperature may be in the range of 50 to 180° C.

Examples of polymerization initiators which may be optionally used include, for example, peroxyketals, such as 1,1-bis(t-butylperoxy)cyclohexane, 1,1-bis(t-butylperoxy)-3,3,5-trimethylcyclohexane, n-butyl-4,4-bis(t-butylperoxy) valerate; dialkylperoxides, such as di-t-butylperoxide and 2,5-dimethyl-2,5-di(t-butylperoxy)hexane; diacyl peroxides, such as benzoyl peroxide and m-toluoyl peroxide; peroxy esters, such as t-butyl peroxybenzoate; and other polymerization initiators, such as peroxydicarbonates, ketone peroxides, and hydroperoxides. They may be used alone or as a mixture of two or more. The amount of the polymerization initiator added is preferably not more than 10% by weight based on the styrene monomer. When the amount of the polymerization initiator added exceeds 10% by weight, it is difficult to control the polymerization rate.

A solvent may be allowed to be present during the polymerization. Solvents include aromatic hydrocarbons, for example, one member or a mixture of at least two members selected from among toluene, xylene, and ethylbenzene, etc. The amount of the solvent used is in the range of 0 to 50% by weight based on the polymerization solution. When the amount of the solvent used exceeds 50% by weight, the polymerization rate is remarkably lowered. Further, in this case, a large amount of energy is required for the recovery of the solvent, deteriorating the profitability.

In the present invention, if necessary, chain transfer agents, for example, α-methylstyrene linear dimer, n-dodecylmercaptan, t-dodecylmercaptan, 1-phenylbutene-2-fluorene, terpinolene, dipentene, and chloroform can be used. The amount of the chain transfer agent added is preferably not more than 10% by weight based on the styrene monomer. The amount of the chain transfer agent exceeding 10% by weight causes a remarkable lowering in the molecular weight, resulting in an unsatisfactory impact strength.

Styrene polymers (C) of the present invention include styrene homopolymer and copolymers of styrene and monomers copolymerizable with styrene. Examples thereof include polystyrene, a styrene-α-methylstyrene copolymer, a styrene-vinyltoluene copolymer, a styrene-acrylonitrile copolymer, and a styrene-methyl methacrylate copolymer. The proportion of styrene bonds in the styrene copolymer is preferably not less than 50%.

The content of each component may be suitably selected depending upon the desired impact resistance, adhesion, transparency, and moldability. The content of the component (A) in the whole composition is 0.01 to 50% by weight, preferably 1 to 20% by weight, from the viewpoint of the adhesion. The content of the component (B) in the whole composition is 12.5 to 99% by weight, preferably 30 to 60% by weight. When the content of the component (A) is lower than 0.01% by weight, the effect of improving the adhesion does not occur, while when it exceeds 50% by weight, the amount of gel produced by a reaction between polymers is significant, leading to a poor appearance. So far as the styrene content is similar, the influence of the component (A) upon the impact resistance of the whole composition is not very different from that of the component (B). The sum total of the component (A) and the component (e) in the whole composition may be determined by taking into consideration the impact resistance, adhesion, transparency, moldability, cost and the like. The sum total of the component (A) and the component (B) in the whole composition ranges from 15 to 100% by weight. When the sum is lower than 15% by weight, the impact resistance decreases.

The average particle size and the average particle size distribution of the rubber particles dispersed in the rubber-modified styrene resin composition according to the present invention are not particularly limited. However, preferably, the dispersed rubber particles have a particle size distribution having two peaks of a smaller-size particle fraction having an average particle size of 0.1 to 0.6 μm, preferably 0.15 to 0.5 μm, and a larger-size particle fraction having an average particle size of 0.7 to 4.0 μm, preferably 0.8 to 2.0 μm. When the average particle size of the smaller-size particle fraction is less than 0.1 μm, the impact strength is lowered, while when it exceeds 0.6 μm, the appearance remarkably deteriorates. When the average particle size of the larger-size particle fraction is less than 0.7 μm, the impact strength is lowered, while when it exceeds 4.0 μm, the appearance is lowered. If the particle size distribution of the rubber polymer mentioned above has only a single peak, any of the impact resistance, rigidity, and appearance is poor. The term "average particle size" used herein refers to a value obtained by taking a transmission electron photomicrograph of the composition by the ultrathin or ultramicrotomed sectioning method, measuring the circle-converted particle size for 1000 rubber polymer particles, and calculating the average particle size by the following equation:

$$\text{Average particle size} = (\Sigma n_i \cdot D_m^4)/(\Sigma n_i \cdot D_i^3)$$

wherein $n_i$ represents the number of rubber polymer particles having a particle equivalent circular size $D_i$ (μm).

The weight ratio of the smaller-size particle fraction based on the total rubber polymers is not particularly restricted and, is 5 to 75% by weight, preferably 5 to 45% by weight. When the weight ratio of the smaller-size particle fraction is lower than 5% by weight, the appearance is poor, while when it exceeds 75% by weight, the impact strength is remarkably lowered.

The term "weight ratio of the smaller-size particle fraction" used herein refers to a value obtained by taking a transmission electron photomicrograph of the composition by the ultrathin or ultramicrotomed sectioning method, measuring the circle-converted particle size for 1000 rubber polymer particles, and calculating the average particle size by the following equation:

$$\text{The weight ratio of the smaller-size particle fraction} = \Sigma(D_{si})^3/\Sigma(D_i)^3 \times 100$$

wherein D and $D_s$ represent the particle size and $D_s$ having the size less than 0.6 μm.

In the present invention, the rubber-modified styrene resin composition having a particle size distribution of two peaks may be prepared by various methods, for example, (1) a method wherein two rubber polymers, an epoxy-modified block copolymer and a polybutadiene rubber, are used as the rubber polymer to polymerize the styrene monomer, (2) a method wherein a rubber-modified styrene resin composition containing rubber particles having a smaller particle size and a rubber-modified styrene resin composition containing rubber particles having a larger particle size are separately prepared followed by blending these compositions by means of a blender or an extruder, (3) a method wherein a polymerization solution containing a rubber polymer having a smaller particle size and a polymer solution containing a rubber polymer having a larger particle size are separately prepared respectively using two polymerizers followed by mixing of both solutions to complete the polymerization, and (4) a method wherein a rubber polymer having a smaller particle size and a rubber polymer having a larger particle size are simultaneously prepared in a polymerization process by operating a particle disperser in an interval manner or by other methods. Among the above methods, the method (1), wherein two rubber polymers, an epoxy-modified block copolymer and a polybutadiene rubber, are used as the rubber polymer to polymerize the styrene monomer, is preferred from the viewpoints of cost and process.

The particle size of the rubber polymer may be controlled by a method wherein rubber polymers having different viscosities are used, a method wherein the polymerization temperature, the stirring speed, the amount of initiator and the like are varied in a polymerization process of a mixed solution of a styrene monomer with a rubber polymer, or other methods.

The rubber-modified styrene resin composition of the present invention, if necessary, contains additives, for example, lubricants, such as zinc stearate, calcium stearate, or ethylene-bisstearylamide, plasticizers, such as a mineral oil, antioxidants, such as phenolic and phosphoric antioxidants, ultraviolet absorbers, flame retardants, antistatic agents, fillers, colorants, and dimethylsilicone oil.

The composition of the present invention, if necessary, may further contain various additives, for example, fillers, colorants, stabilizers, antistatic agents, ultraviolet absorbers, lubricants, and antiblocking agents, so far as these additives are not detrimental to the effect of the present invention.

The rubber-modified styrene resin composition of the present invention may be used as a resin composition prepared by blending or melt-kneading the composition with polystyrene in a bead or pellet form, or alternatively may be used as a resin composition prepared by blending or melt-kneading the composition with a polymer(s) other than polystyrene, for example, a styrene/butadiene copolymer rubber, polyphenylene ether, or polycarbonate.

The molding of the composition of the present invention obtained by any molding method, for example, injection molding, extrusion molding, and compression molding. A sheet, a film, or a tube may be prepared by the extrusion molding such as extrusion molding using T-die (unstretching, uniaxial stretching, or biaxial stretching) and inflation molding. For the composition of the present invention, the stretch ratio, the stretch rate, and the tentering temperature may be the same as those for the conventional styrene resin composition. The stretching conditions may vary depending upon the composition's proportion and styrene content of the block copolymer and the stretching method.

The sheet, film, or tube may be used to prepare a vessel and the like. Preferred methods for preparing the vessel of the present invention include forming methods for conventional styrene sheets, such as hot plate forming and vacuum forming.

The composition of the present invention has excellent thermal adhesion to various materials, especially metals, and functions not only as a vessel structure but also as an adhesive layer. Therefore, the mere heating of a part of the vessel, prepared from the composition of the present invention, together with an aluminum foil results in the formation of a vessel sealed with an aluminum foil without providing any special adhesive layer. The adhesion of the composition according to the present invention depends greatly upon the content of epoxy groups contained in the composition, and the adhesion increases with the lowering of the epoxy equivalent. The preferred epoxy equivalent of the whole composition depends upon the adhesion required of the final product. When the epoxy equivalent is too low, the gel generated by the secondary reaction cannot be ignored. Any epoxy equivalent may be selected so far as the gel is not generated.

Multilayer moldings and sheets each having an outermost layer of the composition of the present invention may be prepared to increase the surface adhesion.

The molding prepared from the composition of the present invention may be applied to various housings, a tray, a food packaging vessel, a portion cup, a blister packaging sheet, a heat shrinkable sheet and the like.

TECHNICAL ADVANTAGES

The rubber-modified styrene resin composition of the present invention can provide a molding having an excellent quality balance, that is, a high impact strength and excellent surface gloss, without using any complicated process.

The resin composition of the present invention have excellent adhesion and moldability and can be applied to various moldings, food packaging vessels and the like.

EXAMPLES

The present invention will now be described in more detail with reference to the following examples, though it is not limited to the Examples only. In the following Examples and Comparative Examples, the Izod impact strength was measured according to JIS K-6871, and the surface gloss was measured according to JIS Z-8742.

Example 1

A polymerizer having an internal capacity of 30 liters was charged with 20 kg of a mixed solution composed of 91% by weight of a styrene monomer, 7% by weight of a polybutadiene rubber (BR122OSG, viscosity as 5% styrene solution: 72 cps, manufactured by Nippon Zeon Co., Ltd.), and 2% by weight of an epoxy-modified block copolymer (styrene content: 40% by weight, epoxy equilvalent: 560), and 5 g of terpinolene was added as a chain transfer agent. While stirring the mixture at a stirring rate of 40 rpm (round per minute), polymerization was carried out at a temperature of 120° C. for 3 hr and subsequently at 140° C. for 2 hr. Further, while stirring the reaction mixture at a speed of 20 rpm, polymerization was carried out at 150° C. for 2 hr, followed by vaporization of volatile substances or matters at 220° C. for 20 min, thereby preparing a resin composition as a pellet. The pellet was then injection-molded into test pieces, for measurement of physical properties, which were then used to measure the Izod impact strength and the surface gloss.

Further, a transmission electron photomicrograph was taken to measure the average particle size of the dispersed rubber particles. Properties of the resin composition are given in Table 1.

Example 2

A sample was introduced into a polymerizer in the same manner as in Example 1, and 2 g of t-butylperoxybenzoate was added as an initiator. While stirring the mixture at a speed of 40 rpm, polymerization was carried out at a temperature of 115° C. for 3 hr and subsequently at 135° C. for 2 hr. Further, while stirring the reaction mixture at a speed of 20 rpm, polymerization was carried out at 150° C. for 2 hr, followed by vaporization of the volatile substances at 220° C. for 20 min, thereby preparing a resin composition as a pellet. The resin composition was evaluated, and the results are given in Table 1.

Example 3

A sample was introduced into a polymerizer in the same manner as in Example 1. While stirring the sample at a speed of 40 rpm, polymerization was carried out at a temperature of 120° C. for 3 hr, and, subsequently, while stirring the sample at a speed of 20 rpm, polymerization was carried out at a temperature of 140° C. for 2 hr. Further, while stirring the reaction mixture at a speed of 10 rpm, polymerization was carried out at 150° C. for 2 hr, followed by vaporization of the volatile substances at 220° C. for 20 min, thereby preparing a resin composition as a pellet. The resin composition was evaluated, and the results are given in Table 1.

Example 4

A resin composition was prepared in the same manner as in Example 3, except that 20 kg of a mixed solution composed of 88.6% by weight of a styrene monomer, 9.4% by weight of a styrene-butadiene copolymer rubber (Tufdene 2100AS, styrene content: 25% by weight, viscosity as 5% styrene solution: 85 cps, manufactured by Asahi Chemical Industry Co., Ltd.), and 2% by weight of an epoxy-modified block copolymer (styrene content:40% by weight, epoxy equivalent:560) and 5 g of terpinolene as a chain transfer agent therein were used as raw materials in Example 3.

Example 5

A resin composition was prepared in the same manner as in Example 1, except for the starting materials shown in Table.

Comparative Example 1

A resin composition was prepared in the same manner as in Example 1, except that a styrene/butadiene compolymer rubber (Asaprene 670A, styrene content: 40% by weight, viscosity as 5% styrene solution: 35 cps, manufactured by Asahi Chemical Industry Co., Ltd.) was substituted for the epoxy-modified block copolymer used in Example 1. The resin composition was evaluated, and the results are given in Table 1.

Comparative Example 2

A resin composition was prepared in the same manner as in Example 1, except that the epoxy-modified block copolymer used in Example 1 was not used and the amount of the polybutadiene rubber and the amount of the styrene monomer were changed respectively to 8% by weight and 92% by weight. The resin composition was evaluated, and the results are given in Table 1.

Comparative Example 3

A resin composition was prepared in the same manner as in Example 4, except that the epoxy-modified block copolymer used in Example 4 was not used and the amount of the styrene-butadiene copolymer rubber and the amount of the styrene monomer were changed respectively to 11% by weight and 89% by weight.

TABLE 1

|  | Ex. | | | | | Comp. Ex. | | |
| --- | --- | --- | --- | --- | --- | --- | --- | --- |
|  | 1 | 2 | 3 | 4 | 5 | 1 | 2 | 3 |
| Amt. of styrene monomer charged (wt %) | 91 | 91 | 91 | 86.3 | 89 | 91 | 92 | 89 |
| Amt. of polybutadiene rubber charged (wt %) | 7 | 7 | 7 | — | 4 | 7 | 8 | — |
| Amt. of epoxy-modified block copolymer charged (wt %) | 2 | 2 | 2 | 2 | 7 | — | — | — |
| Amt. of styrene/butadiene copolymer rubber charged (wt %) | — | — | — | 11.7 | — | 2 | — | 11 |
| Average particle size of smaller-size rubber particles ($\mu$m) | 0.2 | 0.2 | 0.4 | 0.3 | 0.2 | — | — | — |
| Average particle size of larger-size rubber particles ($\mu$m) | 1.1 | 1.0 | 1.2 | 0.7 | 1.1 | 0.7 | 1.3 | 0.7 |
| Amt. of smaller-size rubber particles (wt %) | 43 | 41 | 38 | 54 | 69 | — | — | — |
| Amt. of larger-size rubber particles (wt %) | 57 | 59 | 62 | 46 | 31 | 100 | 100 | 100 |
| Izod impact strength (kg · cm/cm) | 9.4 | 10.1 | 9.5 | 8.8 | 8.9 | 8.3 | 11.4 | 8.5 |
| Surface gloss (%) | 96 | 100 | 94 | 103 | 104 | 89 | 64 | 84 |

As is apparent from Table 1, the rubber-modified styrene resin compositions of Examples 1 to 3 according to the present invention had an an impact strength and surface gloss contemplated in the present invention. By contrast, the resin composition of Comparative Example 1 had an poor impact strength and surface gloss due to the homogeneous average particle size of the rubber polymer. Further, due to the presence of only a rubber polymer having a larger particle size, the resin composition of Comparative Example 2 had a high impact strength, but had a markedly lowered surface gloss.

Examples 6 to 10

Polystyrene (E183, manufactured by Sumitomo Chemical Co., Ltd.), a diene block copolymer (KK38, styrene content 70% by weight, manufactured by Phillips), and an epoxidized diene block copolymer (styrene content 70% by weight, epoxy equivalent 675 g/eq) prepared by epoxidizing KK38 were blended together according to the formulation specified in Table 2 by means of a Henschel mixer. A sheet extruder was used under the conditions of a resin temperature of 210° C., screw revolution speed of 30 rpm, T-die lip clearance of 1.5 mm, lip width of 500 mm, first roll temperature of 90° C., second roll temperature of 60° C., and take-up rate of 700 mm/min to prepare a 1.0 mm-thick sheet. The sheet was cut into a size of 15 mm in width×125 mm in length. A 10 μm-thick aluminum foil having the same size as the sheet or a 100 μm-thick polyethylene terephthalate film having the same size as the sheet was put on and heat-sealed to the sheet by a distance from one end to 25 mm from the one end (pressure of 0.7 kg/cm²; sealing temp. of 208 °C.; sealing time of 0.70 sec). One hr after sealing, a 180° peel test was carried out at a take-up rate of 200 mm/min to measure the peel strength. Further, in order to evaluate the moldability, the sheet was applied to a sheet single pressure forming machine (manufactured by Asano Seisakusho) to form a vessel (90×60×50 mm) (hot plate temp. of 130° C.).

Comparative Example 4

Polystyrene (E183, manufactured by Sumitomo Chemical Co., Ltd.) and a diene block copolymer (KK38, manufactured by Phillips) were blended together according to the formulation specified in Table 2 by means of a Henschel mixer. Thereafter, sheet extrusion, evaluation of the sheet for adhesion to an aluminum foil or a PET film, and evaluation of the sheet for moldability into a vessel were conducted in the same manner as in the Example.

TABLE 2

|  | Ex. 6 | Ex. 7 | Ex. 8 | Ex. 9 | Ex. 10 | Comp Ex. 4 |
| --- | --- | --- | --- | --- | --- | --- |
| Amt. of polystyrene (wt %) | 50 | 50 | 50 | 20 | 50 | 50 |
| Amt. of SBS (wt %) | 45 | 40 | 30 | 60 | — | 50 |
| Amt. of epoxy-modified SBS (wt %) | 5 | 10 | 20 | 20 | 50 | — |
| adhesion to an aluminum foil kgf/cm | 0.85 | 1.0 | 1.3 | 2.0 | 2.1 | 0.50 |
| adhesion to a PET film kgf/cm | 0.65 | 0.83 | 0.90 | 1.1 | 0.95 | 0.40 |
| moldability | good | good | good | good | good | good |

Examples 11 to 15

Polystyrene (G-12-55, manufactured by Sinnittetu Chemical Co., Ltd.), a diene block copolymer (KK38, styrene content of 70% by weight, manufactured by Phillips), and an epoxidized diene block copolymer (styrene content of 70% by weight, epoxy equivalent of 675 g/eq) prepared by epoxidizing KK38 were blended together according to the formulation specified in Table 3 by means of a Henschel mixer. The mixture was then injection-molded into test pieces for measurement of tensile strength and test pieces for measurement of Izod impact strength, and evaluated in view of physical properties and surface condition.

Comparative Examples 5 to 6

Polystyrene (G-12-55, manufactured by Sinnittetu Chemical Co., Ltd.) and a diene block copolymer (KK38, manufactured by Phillips) were blended together according to the formulation specified in Table 3 by means of a Henschel mixer. Thereafter, the mixture was then injection-molded into test pieces for measurement of tensile strength and test pieces for measurement of Izod impact strength, and evaluated in view of physical properties and surface condition.

TABLE 3

|  | Ex. 11 | Ex. 12 | Ex. 13 | Ex. 14 | Ex. 15 | Comp Ex. 5 | Comp Ex. 6 |
| --- | --- | --- | --- | --- | --- | --- | --- |
| Amt. of polystyrene (wt %) | 70 | 50 | 50 | — | — | 50 | — |
| Amt. of SBS (wt %) | 29.5 | 49.5 | 45 | 90 | 99.5 | 50 | — |
| Amt. of epoxy-modified SBS (wt %) | 0.5 | 0.5 | 5 | 10 | 0.5 | — | 100 |
| tensile strength (MPa) | 38 | 30 | 31 | 13 | 13 | 13 | 15 |
| Izod impact strength (J/m) | 3.0 | 4.7 | 4.5 | not fractured | not fractured | 4.8 | not fractured |
| surface condition | good | good | good | good | good | good | gelation |
| adhesion to an aluminum foil kgf/cm | 0.85 | 1.0 | 0.94 | 2.3 | 1.1 | 0.50 | 3.7 |

What is claimed is:

1. A styrene resin composition comprising (A) an epoxidized block copolymer of a styrene monomer with an epoxidized conjugated diene compound, (B) a non-modified synthetic rubber and (C) a styrene polymer.

2. The composition as claimed in claim 1, which comprises a matrix of (C) and a particulate rubber polymer dispersed in the matrix, said rubber polymer comprising (A) and (B).

3. The composition as claimed in claim 1, in which (B) is an alkadiene polymer.

4. The composition as claimed in claim 1, in which (B) is polybutadiene or a copolymer rubber of a styrene monomer and butadiene.

5. The composition as claimed in claim 1, in which (A) is an epoxidized block copolymer of styrene with a conjugated diene and (B) is polybutadiene.

6. The composition as claimed in claim 1, in which (B) is a sole non-modified synthetic rubber.

7. The composition as claimed in claim 2, in which a weight ratio of (A)/(B) is in the range of (50:50) to (1:99).

8. The composition as claimed in claim 1, in which (A) is an epoxidized block copolymer of 20 to 60 percent by weight of styrene with 80 to 40 percent by weight of a conjugated diene.

9. The composition as claimed in claim 7, in which (A) is an epoxidized block copolymer of 24 to 60 percent by weight of styrene with 76 to 40 percent by weight of a conjugated diene.

10. The composition as claimed in claim 1, in which (A) has an epoxy equivalent of 140 to 7000.

11. The composition as claimed in claim 7, in which (A) has an epoxy equivalent of 140 to 2700.

12. The composition as claimed in claim 2, in which the particulate rubber polymer has (i) a smaller-size particle fraction having an average particle size of 0.1 to 0.6 μm and (ii) a larger-size particle fraction having an average particle size of 0.7 to 4.0 μm.

13. The composition as claimed in claim 12, in which a weight ratio of (i) the smaller-size particle fraction to (ii) the larger-size particle fraction is in the range of 75:25 to 5:95.

14. The composition as claimed in claim 11, in which a weight ratio of (i) the smaller-size particle fraction to (ii) the larger-size particle fraction is in the range of 45:55 to 5:95.

15. An article molded from the composition as defined in claim 2.

16. The composition as claimed in claim 1, in which (A), (B) and (C) are blended with each other.

17. The composition as claimed in claim 1, in which (B) is an alkadiene polymer.

18. The composition as claimed in claim 1, in which (B) is polybutadiene or a copolymer rubber of styrene and butadiene.

19. The composition as claimed in claim 1, in which (B) is a sole non-modified synthetic rubber.

20. The composition as claimed in claim 1, which comprises 0.01 to 50% by weight of (A), 12.5 to 99.9% by weight of (B) and 0 to 75% by weight of (C), the sum total of (A) and (B) ranging from 15 to 100 percent by weight.

21. The composition as claimed in claim 1, which comprises 1 to 20% by weight of (A), 30 to 60% by weight of (B) and 0 to 75% by weight of (C), the sum total of (A) and (B) ranging from 15 to 100 percent by weight.

22. The composition as claimed in claim 1, in which (B) is a copolymer rubber of 30 to 90 percent by weight of a styrene monomer and 70 to 10 percent by weight of a conjugated diene monomer.

23. The composition as claimed in claim 1, in which (A) has an epoxy equivalent of 140 to 7000.

24. An article molded from the composition as defined in claim 1.

25. The article as claimed in claim 24, in which (A), (B) and (C) are blended with each other.

26. The article as claimed in claim 24, in which (B) is an alkadiene polymer.

27. The article as claimed in claim 24, in which (B) is polybutadiene or a copolymer rubber of styrene and butadiene.

28. The article as claimed in claim 24, in which (B) is a sole non-modified synthetic rubber.

29. The article as claimed in claim 24, which comprises 0.01 to 50% by weight of (A), 12.5 to 99.9% by weight of (B) and 0 to 75% by weight of (C), the sum total of (A) and (B) ranging from 15 to 100 percent by weight.

30. The article as claimed in claim 24, which comprises 1 to 20% by weight of (A), 30 to 60% by weight of (B) and 0 to 75% by weight of (C), the sum total of (A) and (B) ranging from 15 to 100 percent by weight.

31. The article as claimed in claim 24, in which (B) is a copolymer rubber of 30 to 90 percent by weight of a styrene monomer and 70 to 10 percent by weight of a conjugated diene monomer.

32. The article as claimed in claim 24, in which (A) has an epoxy equivalent of 140 to 7000.

33. The article as claimed in claim 24, which is obtainable by extrusion molding.

34. The article as claimed in claim 24, which is obtainable by injection molding.

35. The composition as claimed in claim 2, in which a weight ratio of (A)/(B) is in the range of (50:50) to (1:99) and the particulate rubber polymer has (i) a smaller-size particle fraction having an average particle size of 0.1 to 0.6 μm and (ii) a larger-size particle fraction having an average particle size of 0.7 to 4.0 μm.

36. A styrene resin composition comprising (A) an epoxidized block copolymer of a styrene monomer with a conjugated diene compound, (B) a non-modified synthetic rubber and (C) a styrene polymer, wherein the epoxidized block copolymer (A) has the structure styrene block-epoxidized conjugated diene compound-styrene block.

37. The composition as claimed in claim 36, wherein the epoxidized block copolymer (A) contains from 20–60 wt. % of the styrene monomer and 80–40 wt. % of the conjugated diene.

* * * * *